(12) United States Patent
Hedrick

(10) Patent No.: US 6,879,365 B2
(45) Date of Patent: Apr. 12, 2005

(54) LOW REFLECTIVITY FLAT PANEL DISPLAY

(75) Inventor: Geoffrey S. M. Hedrick, Malvern, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 70 days.

(21) Appl. No.: 10/375,402

(22) Filed: Feb. 27, 2003

(65) Prior Publication Data

US 2003/0160740 A1 Aug. 28, 2003

Related U.S. Application Data

(60) Provisional application No. 60/360,291, filed on Feb. 27, 2002.

(51) Int. Cl.[7] .............................................. G02F 1/1335
(52) U.S. Cl. ....................................... 349/137; 359/601
(58) Field of Search ........................... 349/137, 96, 112; 345/32; 313/500, 505, 506, 512; 359/601, 603

(56) References Cited

U.S. PATENT DOCUMENTS

| | | | |
|---|---|---|---|
| 5,554,911 A | * | 9/1996 | Nakayama et al. ......... 313/504 |
| 5,959,711 A | | 9/1999 | Silverstein et al. |
| 6,262,441 B1 | * | 7/2001 | Bohler et al. ................ 257/103 |
| 6,670,772 B1 | * | 12/2003 | Arnold et al. ............ 315/169.3 |
| 6,686,980 B1 | * | 2/2004 | Ichihashi ...................... 349/96 |
| 6,731,363 B2 | * | 5/2004 | Nakamura et al. .......... 349/137 |
| 2001/0049893 A1 | | 12/2001 | Maas et al. |
| 2002/0195932 A1 | | 12/2002 | Steckl et al. |

* cited by examiner

Primary Examiner—Kenneth Parker
Assistant Examiner—David Chung
(74) Attorney, Agent, or Firm—Cohen, Pontani, Lieberman & Pavane

(57) ABSTRACT

An improved flat panel display provides reduced reflection of incident light on the display to improve display visibility. The display includes a transparent top cover panel such as glass which is bonded or laminated to the display polarizer. The outer viewing surface of the top cover panel carries a plurality of integral surface features defined in the surface, which may comprise etched bumps or micro-machined tetrahedron-shaped protuberances that may be truncated, smoothed, and/or variously oriented and sized to further reduce incident light reflectivity. A multi-layer HEA coating on the featured surface defines a graduated transition layer with an index of refraction that gradually, and preferably smoothly, varies from layer to layer of the HEA coating from the index of refraction of the top cover panel to the index of refraction of the ambient air or other material which the outermost viewable surface of the display presents an image to an observer or viewer.

63 Claims, 1 Drawing Sheet

LOW REFLECTIVITY FLAT PANEL DISPLAY

RELATED APPLICATIONS

This application claims priority from U.S. Provisional Patent Application Ser. No. 60/360,291, which was filed on Feb. 27, 2002.

BACKGROUND OF THE INVENTION

1. Field of the Invention

The present invention is directed to flat panel displays and, in particular, to flat panel displays having improved low reflectivity.

2. Discussion of Related Art

A well-known problem associated with the viewing of an image through a sheet of glass or other light-transmissive or transparent material is that reflections of light or images originating on the viewing side of the material sheet can easily impede or interfere with or, in extreme cases, virtually prevent the successful viewing of the subject matter intended or desired to be observed through the transparent material sheet. This problem is particularly significant when viewing an image presented on an electronic screen display, such as a liquid crystal (LC) or plasma or other type of flat panel display. As such flat panel displays have become increasingly ubiquitous in devices and environments of all variety and in widely diverse applications, the need to minimize interference from reflections in the viewing of displayed images is more important than ever. Indeed, in some uses of flat panel displays—such for example to display flight data and situational information to the cockpit flight crew of an aircraft in flight—the need to effectively eliminate reflections that can distract the viewer or, even worse, impede or interfere with one's ability to readily perceive displayed data and images can assume a life-threatening urgency.

One long-known way of reducing the apparent reflectivity of a glass sheet is to "frost" the viewing surface—i.e. the "exterior" surface of the sheet which an observer directly views to see, through the sheet, an image that originates on or proximate the opposite "interior" surface of the glass sheet—so that the exterior surface carries a multiplicity of tiny, smoothly-contoured bumps or mounds. Such so-called frosted glass does not itself actually reduce the amount of reflection from the glass, but rather diffuses the reflections. Since the eye most readily perceives the sharp boundaries of contrast that are inherent in a clearly defined image, the resulting diffusion softens the reflected image and thereby creates for the viewer a perception of reduced reflectivity; this is because the "background" image (i.e. that which is viewed through the glass sheet) is visibly sharper than the "foreground" (i.e. reflected) image that has been diffused or softened by the contoured surface bumps on the glass sheet's exterior surface.

Also known for reducing reflections from the viewing surface of a glass or other transparent material sheet are anti-reflective coatings, such as high efficiency anti-reflective (HEA) coatings. HEA coatings are available in a wide variety of forms for application to the surfaces of glass sheets and the like, and have also been applied to glass sheets having a frosted surface to further enhance the viewing of images through the glass while minimizing the actual and perceived effects of reflected images.

SUMMARY OF THE INVENTION

The present invention is directed to construction or configuration aspects of a flat panel liquid crystal display for improving resolution by decreasing the reflectivity caused by incident light. Such a display conventionally includes a substrate upon which an array of electrodes is disposed or formed for activating selected pixels from an array of pixels. A polarizer is disposed on the substrate over the electrode array for polarizing light received by the electrode array, and a layer of anti-reflective transparent material is disposed on the polarizer and secured thereto, such as by bonding or laminating the polarizer to the transparent material. The transparent material has a viewing surface which supports or otherwise has formed thereon a plurality of surface details. A layer of anti-reflective coating is disposed on the viewing surface over the surface details. The material used as the antireflective coating is selected with an index of refraction substantially no greater than the index of refraction of the transparent material. The transparent material and anti-reflective coating, coupled with the interaction of the surface details with incident light on the viewing surface, produces very low actual and perceived reflectance while providing clear and high contrast display of images to a viewer of the display.

In one embodiment, the surface details are configured as bumps, and in another embodiment the surface details are configured as tetrahedrons which may have truncated apexes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to illustrate the structures and procedures described herein in a manner sufficient to facilitate an understanding and appreciation of the invention.

BRIEF DESCRIPTION OF DRAWINGS

In the drawings, wherein like reference numerals denote similar elements throughout the several views.

DETAILED DESCRIPTION OF THE CURRENTLY PREFERRED EMBODIMENTS

Figure 1:
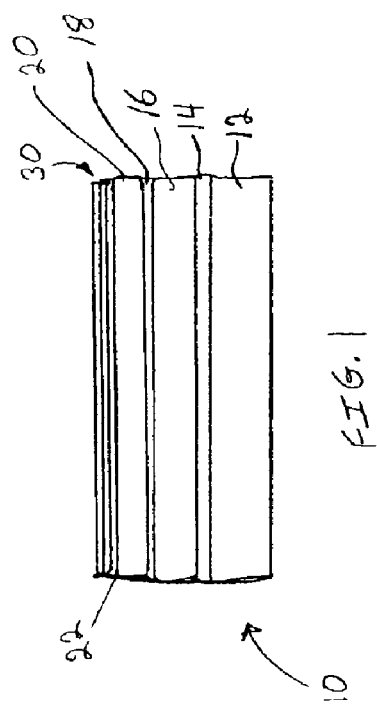
FIG. 1 is a cross-sectional view of a liquid crystal display constructed in accordance with one embodiment of the present invention.

A flat panel liquid crystal display (LCD) 10 shown in cross-section in FIG. 1 includes a glass substrate 12 which may be transparent for backlit-type displays or reflective (i.e. a mirrored) for reflective-type displays. The substrate 12 supports an electrode layer 14 that forms an array of pixels as is well known to those of ordinary skill in the art. A polarizer sheet 16 is disposed over the pixel layer 14 and a sheet of specially-treated transparent material 20—which may for example be a high quality glass—is laminated or bonded to or over the flat panel display polarizer 16 using a bonding layer or laminate 18. As currently implemented, the transparent material layer 20 may be a sheet of glass having a thickness of about 50 thousandths (0.050) of an inch which is bonded or laminated to the polarizer 16. It is particularly desirable to minimize the spacing or gap between the polarizer 16 and glass cover sheet 20 for image clarity and enhanced viewing ease without added distortion of displayed images. In a preferred embodiment, the bonding layer 18 is formed by a clear or transparent silicon adhesive gel that has an index of refraction at least close to that of the cover glass 20, and which hardens from its initial gel-like viscous condition of application. The gel-like viscosity of the silicon adhesive avoids undesirable seepage, prior to hardening or curing, of the adhesive into portions of the components of the flat panel display (e.g. the pixel layer 14) to which the glass cover sheet 20 is bonded or laminated, and permits the spacing between the glass cover sheet and the viewing side of the polarizer 16 to be limited to about one-sixteenth (1/16) inch or less, as is preferred. Alternatively, a clear or transparent liquid epoxy can be used as the bonding layer 18—which may provide more secure bonding of the glass cover sheet 20 to the flat panel display polarizer 16 than a silicon adhesive—in lieu of the silicon adhesive, but additional care must then be taken to avoid seepage of the liquid epoxy (at the time of application) into portions of the sealed casing or components of the flat panel display. Such liquid epoxy should preferably likewise have an index of refraction at least close to that of the glass cover sheet 20.

Prior to its placement or securement on or over the polarizer 16 of the flat panel display, the glass cover sheet 20 is etched or otherwise "frosted" so that it carries a multiplicity of surface details or features such as smoothly contoured bumps or mounds 26 on its exterior or viewing surface 22. In addition, a multi-layer HEA coating 30 is applied to the entire frosted or viewing surface of the glass sheet 20, including over the details 26. HEA multi-layer (Fabry-Perot etalon) coatings are optimized for a given angle of incidence such that the thickness at that angle to the plane of the coating layers is matched to the desired wavelength. Each layer of the HEA coating defines a quarter-wavelength filter tuned to have a particular index of refraction ("IR"). The first HEA coating layer deposited directly on the surface of the glass cover sheet 20 has an index of refraction ($IR_1$) at least close to that of the cover glass 20 which, in the glass material used in current embodiments of the invention, is about 1.51. The last or final or outermost "exposed" $n^{th}$ HEA coating layer most remote from the surface of the glass—i.e. the layer typically in contact with the ambient air (where no other surfaces or fluids are normally disposed atop or against the improved flat panel display of the invention)—has an index of refraction ($IR_n$) at least close to that of the air, which is 1.00. The HEA coating layers between the first and last layers have respective indices of refraction between the indices of refraction of the first and last layers and that gradually vary from close to the index of refraction of the first layer to close to the index of refraction of the last layer. Thus, $IR_n < IR_{n-1} \ldots < IR_2 < IR_1$. It is well known that reflection is the result of a difference in the indices of refraction at the boundary layer between two solid or liquid or fluid materials; in this case the boundary layer is defined (in the absence of the multi-layer HEA coating) by the difference between the index of refraction of the cover glass 20 and the index of refraction of the flat panel display polarizer 16. The multi-layer HEA coating utilized herein thus places, between the surface of the glass and the air, a series of boundary layers that gradually vary the index of refraction from that of the glass to that of the air to thereby reduce reflections of light incident on the exterior or viewing surface of the improved flat panel display of the invention.

The resulting improved flat panel display—formed of a commercial (for example) LCD or the like to which the contoured, frosted, and multi-layer HEA coated glass cover sheet 20 is laminated on or adhered to the display polarizer 16—advantageously exhibits very low actual and viewer-perceived reflectance, on the order of ten percent (10%) or less, while providing the viewer with a bright, clear and high contrast display of images generated by the flat panel LCD 10.

Figure 2:
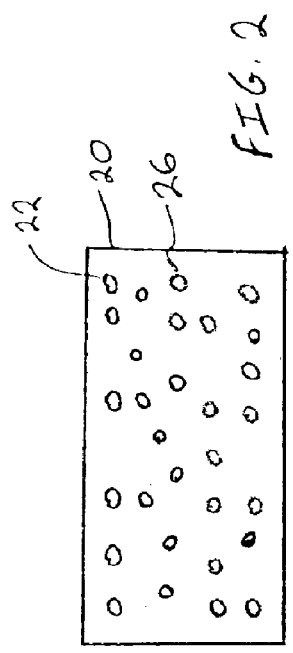
FIG. 2 is a top plan view of the upper viewing surface of the display of FIG. 1.
Figure 4:
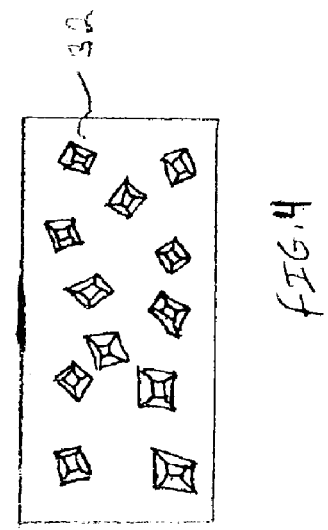
FIG. 4 is a top plan view of the upper viewing surface of a display in accordance with yet another embodiment of the invention.
Figure 3:
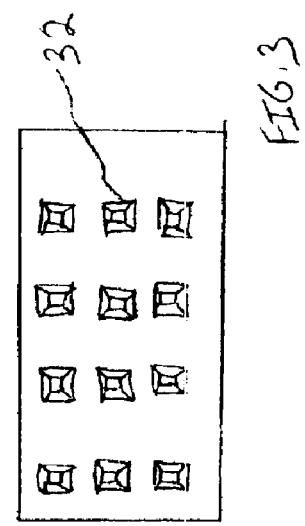
FIG. 3 is a top plan view of the upper viewing surface of a display in accordance with another embodiment of the present invention.

In a preferred embodiment as shown in FIG. 3 the surface details 26 configured in the FIG. 2 embodiment as a multiplicity of smoothly contoured bumps or mounds 26 are instead formed, by micro- or nano-machining the upper surface of the glass transparent layer 20, to define a multiplicity of similarly sized (i.e. tiny) angular tetrahedrons 32 prior to applying a multi-layer HEA coating 30 to the glass surface 20 and then bonding or laminating the glass cover sheet to or over the polarizer 16 of the flat panel display 10. The tetrahedrons 32 may have substantially equal bases and may be uniformly defined along and about the surface, as for example in a predefined regular and or matrix of such details. In most preferred implementations the bases of the tetrahedrons are randomly or otherwise variously rotated (relative to each other) about their upstanding axes that extend substantially perpendicular or transverse to the surface of the transparent layer 20 on which they are defined, as shown in FIG. 4. Although it is within the intended scope and contemplation of the invention that the tetrahedrons defined on a transparent layer 20 may all have substantially the same height and aspect ratios it is further most preferred that the tetrahedrons distributed about a layer 20 have variously different height and aspect ratios, and further that the tops of the tetrahedrons be truncated and/or rounded or smoothed so that the surface of the glass cover sheet is not undesirably abrasive. The tetrahedrons may also alternatively be defined on the sheet or layer 20 in non-regular or effectively randomized locations about the surface.

The tetrahedrons 32 more effectively scatter light incident on the exterior or viewing surface of the glass layer 20 than the smoothly contoured bumps 26 of the embodiment shown in FIG. 2 and thereby more effectively minimize the actual and viewer perceived reflection of incident (i.e. reflectable) light while maintaining superior contrast of display-generated images viewed through the cover glass 20. As a consequence of constant changes in the relative locations and orientations of the glass surface 20, the source(s) of incident (reflectable) light, and the viewer(s) or observer(s), any direct reflections that may reach an observer from the tiny flat or flattened facets of the tetrahedrons are of such short duration as to be virtually unnoticeable or imperceptible and do not interfere with an observer's ability to readily view, without distraction resulting from foreground reflections, background images presented by the flat panel display.

The inventive improved flat panel display 10 that results from this combination of a glass cover sheet 20 carrying a multiplicity of surface details such as tiny upstanding tetrahedrons 32, coated with a multi-layer HEA coating 30 and laminated or bonded to or over the polarizer 16 of what may be an otherwise conventional or commercial flat panel display or image projector exhibits even lower reflectance than that of the first above-described embodiment of FIG. 2 in which the upstanding details carried on the glass surface are smoothly contoured, e.g. in the manner of conventional frosting of the surface. In addition, the resulting improved flat panel display unexpectedly exhibits an enhanced and enlarged viewing angle from which an observer is able to clearly see and perceive images generated by the display.

It is also contemplated that other upstanding or projecting geometric figure surface features may be machined or etched or otherwise defined on the viewing surface of the cover glass, either in lieu of the above-described bumps 26 or tetrahedrons 32 or in addition to the tetrahedrons and/or other geometric figures—i.e. so that the upstanding surface features on cover glass 20 are defined by a mix of various geometric figures. Likewise, the invention may be applied to any flat panel display without regard to the manner in which the display generates images or the materials of construction thereof or the commercial or custom-design origin or heritage of the display. Moreover, it is within the contemplation of the invention that the improved display of the invention may be further encased or utilized in a housing or an environment in which a solid or liquid or fluid material other than air contacts the outer layer of the multi-layer HEA coating, or where an additional coating or material is placed atop the coated cover glass, in which case it is preferred that the outermost or final layer of the multi-layer HEA coating have an index of refraction at least close to the index of refraction of the overlying solid, liquid or fluid material or additional coating or material.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flat panel display for providing improved resolution through decreased reflection of incident light, comprising:
   a substrate;
   an array of electrodes disposed on said substrate for activating selected pixels of an array of pixels;
   a polarizer disposed on said electrode array for polarizing light received by said electrode array;
   a sheet of anti-reflective transparent material disposed on said polarizer, said transparent material having an index of refraction and a viewing surface of said sheet contoured by etching of said viewing surface of said sheet to define on said etched viewing surface a plurality of surface details distributed about the viewing surface; and
   a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display.

2. The display of claim 1, wherein said surface details comprise bumps arranged in a matrix on said viewing surface.

3. The display of claim 1, wherein said surface details comprise bumps arranged in a random pattern on said viewing surface.

4. The display of claim 1, wherein said surface details comprise bumps having substantially equal heights relative to said viewing surface.

5. The display of claim 1, wherein said surface details comprise bumps having a range of different heights relative to said viewing surface.

6. The display of claim 1, wherein said sheet of transparent material is laminated to said polarizer.

7. The display of claim 1, wherein said sheet of transparent material is bonded to said polarizer by a bonding agent comprising one of silicon adhesive and a transparent liquid epoxy, said bonding agent having an index of refraction substantially equal to the index of refraction of said transparent material sheet.

8. The display of claim 1, wherein said layer of anti-reflective coating comprises (n) layers of an HEA anti-reflective coating each having an associated index of refraction and disposed one atop another from a first layer on said viewing surface to an outermost layer most remote from the viewing surface for interfacing an environment in which said display is used, said first layer having an index of refraction substantially equal to the index of refraction of the transparent material and said outermost layer having an index of refraction substantially equal to an index of refraction of the environment, and the n-2 layers between said first and outer layers having indices of refraction that gradually vary from and between the indices of refraction of the first and outer layers.

9. The display of claim 1, wherein said surface details comprise angular tetrahedrons.

10. The display of claim 9, wherein said tetrahedrons are arranged on said viewing surface in a matrix.

11. The display of claim 9, wherein said tetrahedrons are arranged on said viewing surface in a random pattern.

12. The display of claim 9, wherein each said tetrahedron has a longitudinal axis and a height relative to said viewing surface.

13. The display of claim 12, wherein said tetrahedrons have substantially equal heights relative to the viewing surface.

14. The display of claim 9, wherein each said tetrahedron has a truncated apex.

15. The display of claim 12, wherein each said tetrahedron has a common axial alignment.

16. The display of claim 12, wherein each said tetrahedron has a random axial alignment.

17. In a flat panel display operative for generating an image viewable by an observer of the display situated before a front of the display and through an ambient medium that is disposed between the observer and the display and which has an associated index of refraction,
   a transparent material sheet located at the front of the display and through which an image operatively generated by the display is viewable by an observer situated before a viewing surface of the transparent material sheet, said material sheet having an associated index of refraction,
   a plurality of outwardly projecting surface features defined unitarily on and distributed about the viewing surface of the transparent material sheet so that the surface features project outwardly toward the observer, and a multi-layer HEA coating applied over said viewing surface of the transparent material sheet so as to cover said plural surface features and thereby provide an anti-reflective coating over said material sheet viewing surface, each layer of the multi-layer coating having a respective index of refraction, the index of refraction of a first layer of the multiple coating layers which is disposed against said viewing surface being substantially equal to the index of refraction of the material sheet, the index of refraction of an outermost layer of the multiple coating layers which is most remote from said first layer being substantially equal to the index of refraction of the ambient medium, and the index of refraction of each other layer of the multiple coating layers between the first and outermost layers being between the indices of refraction of said first and outermost layers so that the multi-layer HEA coating has an effective index of refraction that gradually varies from the substantially the index of refraction of the material sheet to substantially the index of retraction of the ambient medium to thereby define a graduated transition layer for minimized reflectance between the display and the observer of light incident on the display.

18. In a flat panel display in accordance with claim 17, said surface features comprising a plurality of mounds distributed about the viewing surface of the material sheet and defined by etching of the viewing surface to form an irregular viewing surface.

19. In a flat panel display in accordance with claim 17, said surface features comprising a plurality of irregular mounds distributed about the viewing surface of the material sheet and defined by etching of the viewing surface to form a predeterminately frosted viewing surface.

20. In a flat panel display in accordance with claim 17, said surface features comprising a plurality of tetrahedron-shaped projections distributed about the viewing surface of the material sheet and each having a base and a top portion.

21. In a flat panel display in accordance with claim 20, wherein each said tetrahedron-shaped projection is truncated at its top portion.

22. In a flat panel display in accordance with claim 21, wherein said truncated top portions are rounded.

23. In a flat panel display in accordance with claim 20, wherein the bases of said plural tetrahedron-shaped projections defined on said viewing surface are variously oriented about the viewing surface.

24. In a flat panel display in accordance with claim 20, wherein said plural tetrahedron-shaped projections defined on said viewing surface project outwardly toward the observer by various different amounts.

25. In a flat panel display in accordance with claim 20, wherein said plural tetrahedron-shaped projections defined on said viewing surface have bases of variously different aspect ratios.

26. In a flat panel display in accordance with claim 20, said plural tetrahedron-shaped projections being defined at non-regular locations on and about said viewing surface.

27. In a flat panel display in accordance with claim 20, said plural tetrahedron-shaped projections being defined at locations along a predefined grid on and about said viewing surface.

28. A method for improving observer visibility of images generated by a flat panel display as viewed by an observer situated before a transparent material sheet through which the display-generated images are viewable and which is located at the front of the flat panel display, wherein the observer views the display-generated images through an ambient environment disposed between the observer and the display and which has an associated environment index of refraction, comprising the steps of:

processing a front viewing surface of a transparent material sheet of the display through which an image operatively generated by the display is viewable by the observer situated before the viewing surface to define unitarily on the viewing surface a plurality of outwardly projecting surface features distributed about the viewing surface of the transparent material sheet so that the surface features project outwardly toward the observer, the material sheet having an associated material index of refraction, and said surface features being configured for reducing direct reflection from the viewing surface toward the observer of light incident on the display; and applying a multi-layer HEA coating to the viewing surface on which the plural surface features are defined so as to cover the plural surface features and thereby provide an anti-reflective coating over the material sheet viewing surface, each layer of the multi-layer HEA coating having a respective layer index of refraction, the layer index of refraction of a first layer of the multiple coating layers which is disposed against said viewing surface being substantially equal to the material index of refraction of the material sheet, the layer index of refraction of an outermost layer of the multiple coating layers which is most remote from said first layer being substantially equal to the medium index of refraction of the ambient medium, and the index of refraction of each other layer of the multiple coating layers being between the layer indices of refraction of said first and outermost layers so that the multi-layer HEA coating has an effective index of refraction that gradually varies from the material index of refraction of the material sheet to the medium index of retraction of the ambient medium to thereby define a graduated transition layer for minimized reflectance between the display and the observer of light incident on the display.

29. A method in accordance with claim 28, where said processing step comprises etching the viewing surface of the material sheet so that the surface features comprise a plurality of mounds distributed about the viewing surface of the material to form an irregular viewing surface through which display-generated images are viewable by the observer.

30. A method in accordance with claim 28, wherein said processing step comprises machining the viewing surface of the material sheet to unitarily form on the viewing surface a plurality of tetrahedron-shaped surface features distributed about the viewing surface and each having a base and a top portion that projects outwardly toward the observer.

31. A method in accordance with claim 30, wherein said processing step further comprises machining the tetrahedron-shaped surface features to yield truncated apexes.

32. A method in accordance with claim 30, wherein said processing step further comprises forming said plurality of tetrahedron-shaped surface features in substantial axial alignment with respect to each other.

33. A method in accordance with claim 30, wherein said processing step further comprises forming said plurality of tetrahedron-shaped surface features in random axial alignment with respect to each other.

34. A flat panel display for providing improved resolution through decreased reflection of incident light, comprising:
   a substrate;
   an array of electrodes disposed on said substrate for activating selected pixels of an array of pixels;
   a polarizer disposed on said electrode array for polarizing light received by said electrode array;
   a sheet of anti-reflective transparent material disposed on said polarizer, said transparent material having an index of refraction and a viewing surface of said sheet contoured by machining of said viewing surface of said sheet to define on said machined viewing surface a plurality of surface details distributed about the viewing surface; and
   a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display.

35. The display of claim 34, wherein said surface details comprise bumps arranged in a matrix on said viewing surface.

36. The display of claim 34, wherein said surface details comprise bumps arranged in a random pattern on said viewing surface.

37. The display of claim 34, wherein said surface details comprise bumps having substantially equal heights relative to said viewing surface.

38. The display of claim 34, wherein said surface details comprise bumps having a range of different heights relative to said viewing surface.

39. The display of claim 34, wherein said sheet of transparent material is laminated to said polarizer.

40. The display of claim 34, wherein said sheet of transparent material is bonded to said polarizer by a bonding agent comprising one of silicon adhesive and a transparent liquid epoxy, said bonding agent having an index of refraction substantially equal to the index of refraction of said transparent material sheet.

41. The display of claim 34, wherein said layer of anti-reflective coating comprises (n) layers of an HEA anti-reflective coating each having an associated index of refraction and disposed one atop another from a first layer on said viewing surface to an outermost layer most remote from the viewing surface for interfacing an environment in which said display is used, said first layer having an index of refraction substantially equal to the index of refraction of the transparent material and said outermost layer having an index of refraction substantially equal to an index of refraction of the environment, and the n-2 layers between said first and outer layers having indices of refraction that gradually vary from and between the indices of refraction of the first and outer layers.

42. The display of claim 34, wherein said surface details comprise angular tetrahedrons.

43. The display of claim 42, wherein said tetrahedrons are arranged on said viewing surface in a matrix.

44. The display of claim 42, wherein said tetrahedrons are arranged on said viewing surface in a random pattern.

45. The display of claim 42, wherein each said tetrahedron has a longitudinal axis and a height relative to said viewing surface.

46. The display of claim 45, wherein said tetrahedrons have substantially equal heights relative to the viewing surface.

47. The display of claim 42, wherein each said tetrahedron has a truncated apex.

48. The display of claim 45, wherein each said tetrahedron has a common axial alignment.

49. The display of claim 45, wherein each said tetrahedron has a random axial alignment.

50. A flat panel display for providing improved resolution through decreased reflection of incident light, comprising:
   a substrate;
   an array of electrodes disposed on said substrate for activating selected pixels of an array of pixels;
   a polarizer disposed on said electrode array for polarizing light received by said electrode array;
   a layer of anti-reflective transparent material disposed on said polarizer, said transparent material having an index of refraction and a viewing surface containing a plurality of surface details distributed about the viewing surface; and
   a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display;
   wherein said surface details comprise bumps arranged in a matrix on said viewing surface.

51. A flat panel display for providing improved resolution through decreased reflection of incident light, comprising:
   a substrate;
   an array of electrodes disposed on said substrate for activating selected pixels of an array of pixels;
   a polarizer disposed on said electrode array for polarizing light received by said electrode array;
   a layer of anti-reflective transparent material disposed on said polarizer, said transparent material having an index of refraction and a viewing surface containing a plurality of surface details distributed about the viewing surface; and
   a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display;
   wherein said surface details comprise bumps having a range of different heights relative to said viewing surface.

52. A flat panel display for providing improved resolution through decreased reflection of incident light, comprising:
   a substrate;
   an array of electrodes disposed on said substrate for activating selected pixels of an array of pixels;
   a polarizer disposed on said electrode array for polarizing light received by said electrode array;
   a layer of anti-reflective transparent material disposed on said polarizer, said transparent material having an index of refraction and a viewing surface containing a plurality of surface details distributed about the viewing surface; and
   a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display;

wherein said layer of transparent material is bonded to said polarizer by a bonding agent comprising one of silicon adhesive and a transparent liquid epoxy, said bonding agent having an index of refraction substantially equal to the index of refraction of said transparent material layer.

53. A flat panel display for providing improved resolution through decreased reflection of incident light, comprising:

a substrate;

an array of electrodes disposed on said substrate for activating selected pixels of an array of pixels;

a polarizer disposed on said electrode array for polarizing light received by said electrode array;

a layer of anti-reflective transparent material disposed on said polarizer, said transparent material having an index of refraction and a viewing surface containing a plurality of surface details distributed about the viewing surface; and a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display;

wherein said layer of anti-reflective coating comprises (n) layers of an HEA anti-reflective coating each having an associated index of refraction and disposed one atop another from a first layer on said viewing surface to an outermost layer most remote from the viewing surface for interfacing an environment in which said display is used, said first layer having an index of refraction substantially equal to the index of refraction of the transparent material and said outermost layer having an index of refraction substantially equal to an index of refraction of the environment, and the n-2 layers between said first and outer layers having indices of refraction that gradually vary from and between the indices of refraction of the first and outer layers.

54. A flat panel display for providing improved resolution through decreased reflection of incident light, comprising:

a substrate;

an array of electrodes disposed on said substrate for activating selected pixels of an array of pixels;

a polarizer disposed on said electrode array for polarizing light received by said electrode array;

a layer of anti-reflective transparent material disposed on said polarizer, said transparent material having an index of refraction and a viewing surface containing a plurality of surface details distributed about the viewing surface; and a layer of anti-reflective coating disposed on said viewing surface and having an index of refraction no greater than the index of refraction of said transparent material, said transparent material and said anti-reflective coating producing very low actual and viewer-perceived reflectance while providing a clear and high contrast display of display-generated images to a viewer of said display wherein said surface details comprise angular tetrahedrons.

55. The display of claim 54, wherein said tetrahedrons are arranged on said viewing surface in a matrix.

56. The display of claim 54, wherein said tetrahedrons are arranged on said viewing surface in a random pattern.

57. The display of claim 54, wherein each said tetrahedron has a longitudinal axis and a height relative to said viewing surface.

58. The display of claim 57, wherein said tetrahedrons have substantially equal heights relative to the viewing surface.

59. The display of claim 54, wherein each said tetrahedron has a truncated apex.

60. The display of claim 57, wherein each said tetrahedron has a common axial alignment.

61. The display of claim 57, wherein each said tetrahedron has a random axial alignment.

62. In a flat panel display operative for generating an image viewable by an observer of the display situated before a front of the display and through an ambient medium that is disposed between the observer and the display and which has an associated index of refraction, a transparent material sheet located at the front of the display and through which an image operatively generated by the display is viewable by an observer situated before a viewing surface of the transparent material sheet, said material sheet having an associated index of refraction, and a multi-layer HEA coating applied over said viewing surface of the transparent material sheet to thereby provide an anti-reflective coating over said material sheet viewing surface, each layer of the multi-layer coating having a respective index of refraction, the index of refraction of a first layer of the multiple coating layers which is disposed against said viewing surface being substantially equal to the index of refraction of the material sheet, the index of refraction of an outermost layer of the multiple coating layers which is most remote from said first layer being substantially equal to the index of refraction of the ambient medium, and the index of refraction of each other layer of the multiple coating layers between the first and outermost layers being between the indices of refraction of said first and outermost layers so that the multi-layer HEA coating has an effective index of refraction that gradually varies from the substantially the index of refraction of the material sheet to substantially the index of retraction of the ambient medium to thereby define a graduated transition layer for minimized reflectance between the display and the observer of light incident on the display.

63. A method for improving observer visibility of images generated by a flat panel display as viewed by an observer situated before a front viewing surface of a transparent material sheet through which the display-generated images are viewable and which is located at the front of the flat panel display, wherein the observer views the display-generated images through an ambient environment disposed between the observer and the display and which has an associated environment index of refraction, comprising the step of:

applying a multi-layer HEA coating to the viewing surface so as to cover the viewing surface and thereby provide an anti-reflective coating over the material sheet viewing surface, each layer of the multi-layer HEA coating having a respective layer index of refraction, the layer index of refraction of a first layer of the multiple coating layers which is disposed against said viewing surface being substantially equal to the material index of refraction of the material sheet, the layer index of refraction of an outermost layer of the multiple coating layers which is most remote from said first layer being substantially equal to the medium index of refraction of the ambient medium, and the index of refraction of each other layer of the multiple coating layers being between the layer indices of refraction of said first and outermost layers so that the multi-layer HEA coating has an effective index of refraction that gradually varies from the material index of refraction of the material sheet to the medium index of retraction of the ambient medium to thereby define a graduated transition layer for minimized reflectance between the display and the observer of light incident on the display.

* * * * *